United States Patent [19]

Cole

[11] 4,155,469

[45] May 22, 1979

[54] MOBILE VEHICLE FOR CARRYING BULK MATERIALS OR GENERAL FREIGHT

[76] Inventor: Raymond G. Cole, P.O. Box 697, Huntley, Ill. 60142

[21] Appl. No.: 797,247

[22] Filed: May 16, 1977

[51] Int. Cl.² ............................................. B61D 3/06
[52] U.S. Cl. ................................... 414/524; 105/243; 222/105; 298/27
[58] Field of Search ....................... 296/10; 298/24, 25, 298/26, 27, 28, 29, 30, 31, 32, 33, 34, 35 R, 35 M, 36, 37; 105/243, 423, 239, 360; 222/105, 183, 193; 214/83.28

[56] References Cited

U.S. PATENT DOCUMENTS

| 2,712,797 | 7/1955 | Woehrle et al. .................... 298/7 X |
| 3,222,099 | 12/1965 | Swallert .................................. 296/10 |
| 3,756,469 | 9/1973 | Clark et al. ......................... 298/24 X |
| 3,777,938 | 12/1973 | Nikowitz et al. .................. 298/28 X |
| 4,092,051 | 5/1978 | D'Orazio ................................ 298/24 |

FOREIGN PATENT DOCUMENTS

| 653422 | 9/1964 | Belgium ..................................... 296/10 |
| 949446 | 2/1964 | United Kingdom .................. 214/83.28 |

*Primary Examiner*—Frank E. Werner
*Attorney, Agent, or Firm*—Olson, Trexler, Wolters, Bushnell & Fosse, Ltd.

[57] ABSTRACT

A mobile vehicle is selectively adaptable for carrying either bulk materials or general freight loads. The vehicle comprises a trailer including a suspension comprising at least one axle with wheels attached thereto and a platform mounted upon the suspension to be carried by the axle and wheels. At least one opening is formed in the platform and a closure or cover is provided for selectively covering or exposing the opening. A framework is mounted upon the platform and a collapsible container is attached to the platform. A hopper or a slope pan is mounted below the opening to define a bottom of the container and to permit unloading of bulk materials. The container is selectively erectable for attachment to the framework and is adapted to carry bulk materials when so erected. The container may also be collapsed and stored within the hopper under the closure so that the platform may be used to carry general freight loads.

12 Claims, 7 Drawing Figures

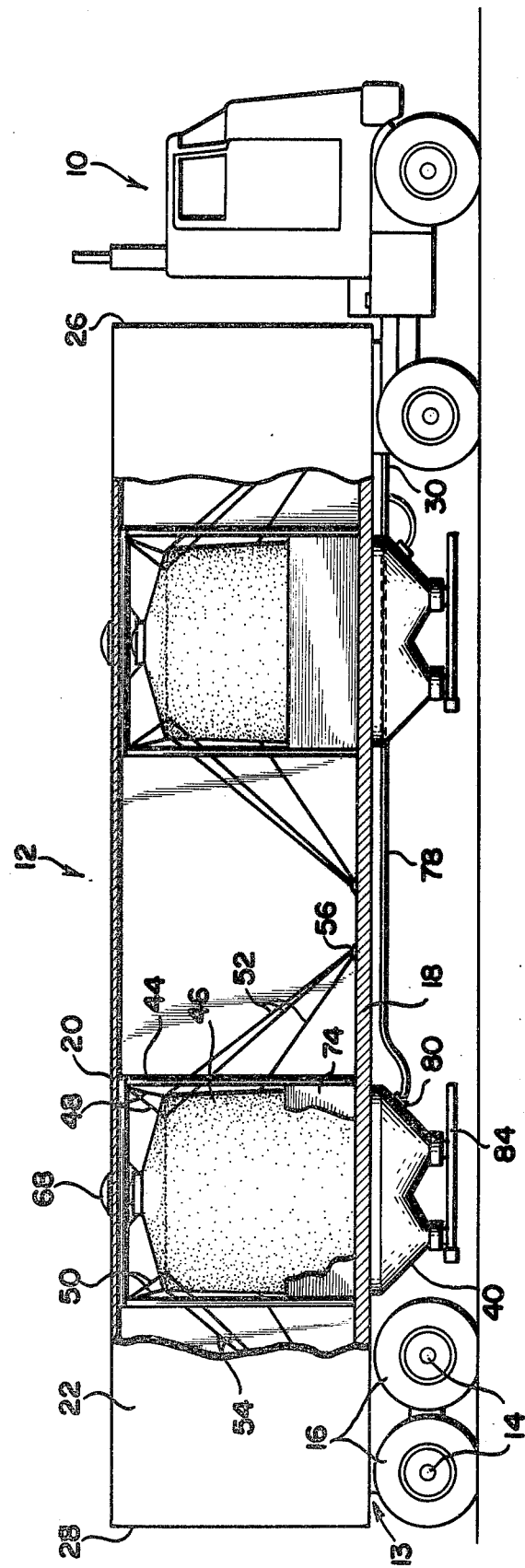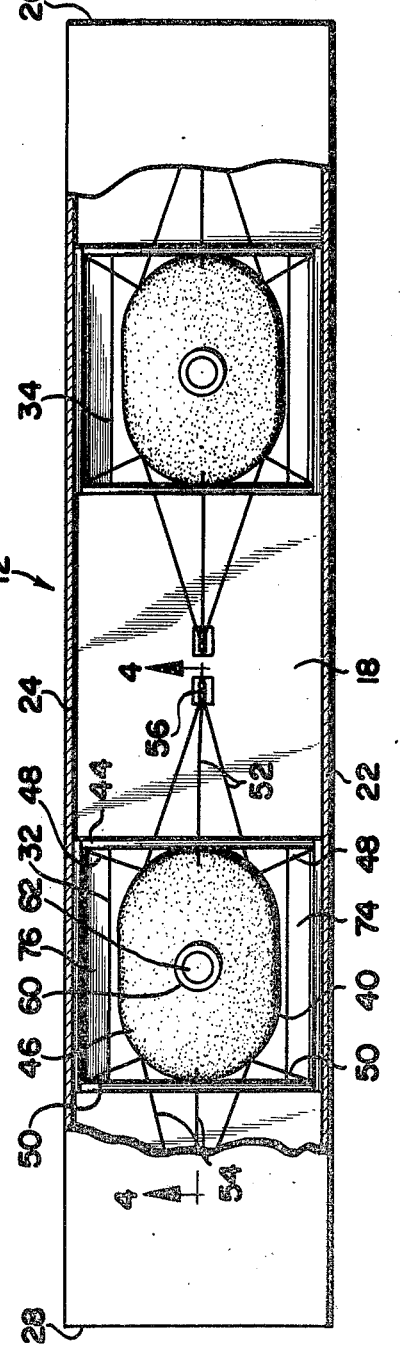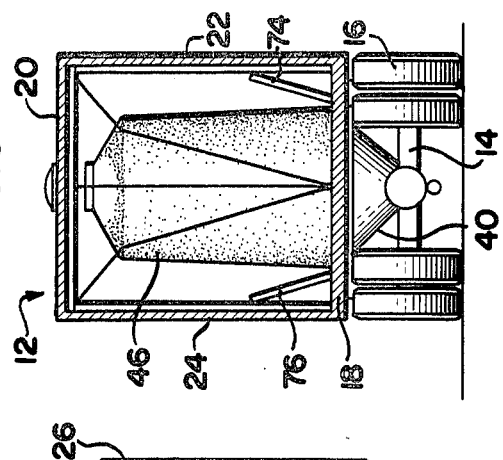

MOBILE VEHICLE FOR CARRYING BULK MATERIALS OR GENERAL FREIGHT

BACKGROUND OF THE INVENTION

Transportation principles of liquid or dry bulk materials and of general freight heretofore have generally required separate types of vehicles for transporting each of these classes of materials. Basically, a van-type trailer vehicle and, in some cases, a flat bed trailer type vehicle are suitable for carrying most general freight loads. However, transport of liquid or dry bulk materials has heretofore required a trailer vehicle especially adapted for carrying these materials to the exclusion of general freight type loads. For example, vehicles adapted to carry dry bulk materials, such as grains, have included one or more permanently mounted rigid metallic container structures including hoppers or similar structures at the bottom thereof for unloading. Similarly, trailers for transporting liquid bulk materials have included similar permanent rigid containers having slope pans connected thereunder for unloading or, alternatively, tank-type trailers.

Thus, an operator wishing to carry both general freight and dry or liquid bulk materials must maintain a considerable number of trailers of appropriate design to accommodate each of these different types of loads. Further, in cases where one type of load is carried to a destination and it is desired to carry a different type of load on the return trip, a second vehicle must be brought in for the return trip, each vehicle making one-half of the journey empty. Obviously, this results in an inefficient use of vehicles and results in needless expenditure of time and effort as well as the expense inherent in expensive equipment being operated empty. Also, the types of vehicles heretofore utilized for carrying bulk materials including containers, bulkheads and the like of heavy rigid metallic construction, require heavy, expensive suspension systems and are relatively heavy vehicles. Thus, the total amount of bulk commodity transportable on such a vehicle may be unduly limited by the vehicle weight which comprises a large proportion of the gross vehicle weight allowed by law and/or regulation.

Further, with present bulk materials carrying vehicles, it is necessary to provide facilities for cleaning the containers prior to taking on new loads to prevent contamination from prior loads, especially when different materials are to be loaded in successive trips.

OBJECTS AND SUMMARY OF THE PRESENT INVENTION

Accordingly, it is an object of the present invention to provide a vehicle capable of being selectively converted for transporting either general freight loads or bulk material loads.

It is another object of the present invention to provide a vehicle in accordance with the foregoing object, in which the conversion from bulk material carrying capability to general freight capability and vice-versa may be accomplished in a minimum amount of time and with the expenditure of a minimum amount of effort.

It is another object of the present invention to provide a vehicle in accordance with the foregoing objects, wherein the weight of the bulk load carrying portions of the vehicle is kept to a minimum to allow for maximum carrying capacity while still retaining sufficient strength to safely and efficiently load, unload and carry bulk materials.

Yet another object of the present invention is to provide a vehicle, in accordance with the foregoing objects, which is further adapted to allow pressurized loading or unloading of bulk materials thereby facilitating efficient and sanitary handling thereof.

Still another object of the present invention is to provide a vehicle, in accordance with the foregoing objects, including means for carrying multiple successive loads of bulk materials while eliminating the necessity of cleaning containers between loads.

Briefly, a trailer vehicle according to the present invention is capable of being relatively quickly converted from a configuration suitable for transporting general freight loads to one suitable for transporting loads of bulk materials and vice-versa. The trailer vehicle comprises mobile trailer means including a platform. At least one opening is formed in the platform and a closure is provided for selectively covering and exposing the opening. A framework is mounted upon the platform and a collapsible container is attached to the platform substantially about the periphery of the opening and selectively erectable for attachment to the framework for containing the bulk materials. A hopper, slope pan or other suitable structure is mounted below the opening to define a bottom of the container and for selectively unloading bulk materials. The container is selectively collapsible to be carried in the hopper with the closure closed thereover to adapt the vehicle for carrying general freight loads upon the platform.

The foregoing, as well as other objects and advantages of the present invention will be more readily appreciated from a consideration of the following detailed description in conjunction with the accompanying drawings wherein like reference numerals are intended to designate like elements and components throughout.

BRIEF DESCRIPTION OF THE DRAWINGS

FIG. 1 is a side elevational view, partially cut away, of a tractor-trailer combination including a trailer incorporating features of the present invention;

FIG. 2 is a top view, partially cut away, of the trailer of FIG. 1;

FIG. 3 is an end view, partially in section, of the trailer of FIGS. 1 and 2;

DETAILED DESCRIPTION

Figure 4:
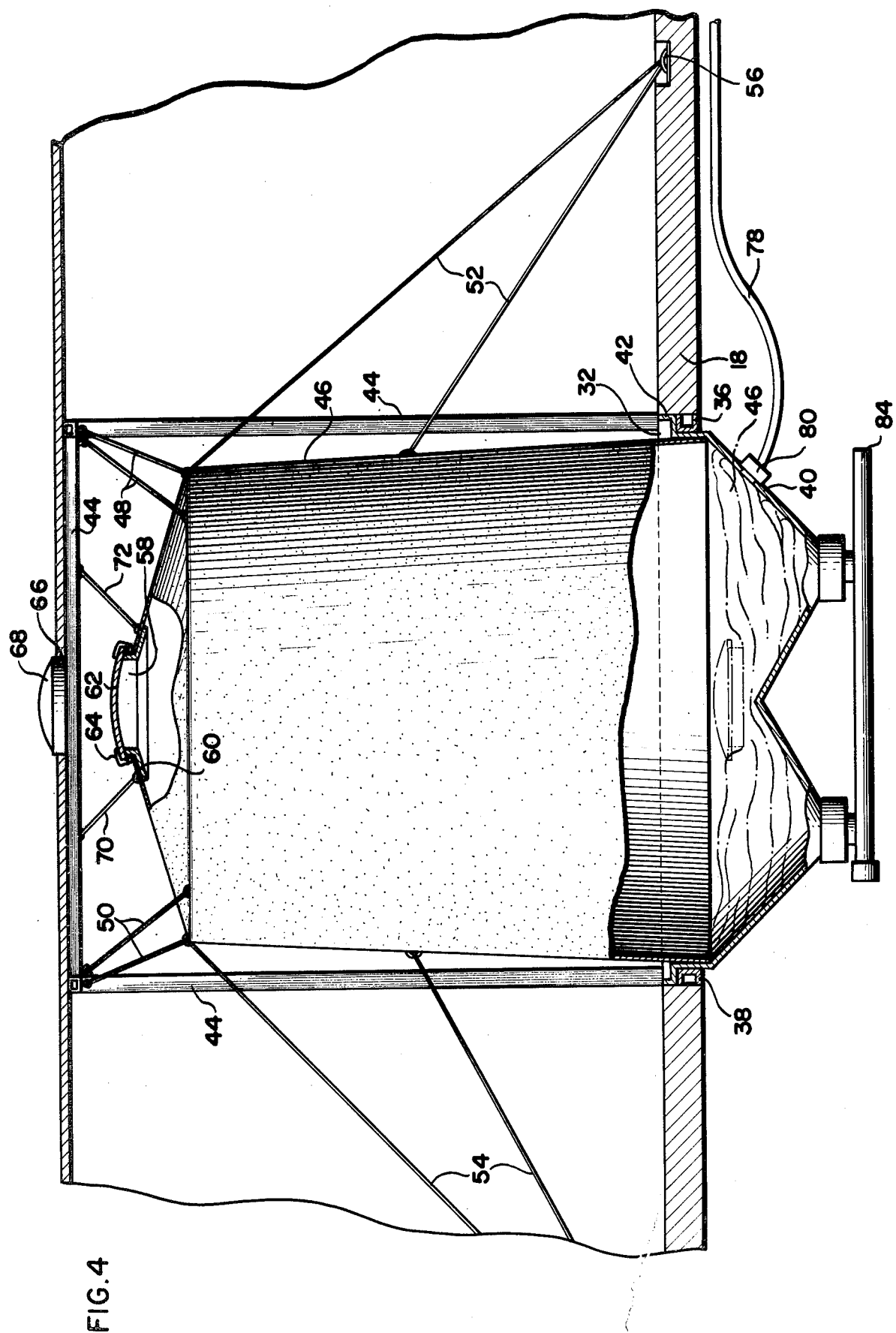
FIG. 4 is an enlarged view, partially in section, taken generally along the line 4—4 of FIG. 2.

Referring now to FIGS. 1 through 4, a first embodiment of a trailer incorporating features of the present invention is illustrated. FIG. 1 shows a tractor 10 connected to a van-type trailer 12, both of known construction. Suffice it to say that the trailer 12 comprises a suspension 13 including one or more axles 14 and wheels 16 attached to the axles, and a platform or floor 18 attached to the suspension 13 to be carried by the axles 14 and wheels 16. The van is enclosed, in the conventional manner, by a top or roof member 20, sidewalls 22 and 24, end wall 26 and a rear closure 28 which may comprise a pair of hinged doors of known construction and operation. The tractor 10 includes a source of pressurized air (not shown), known in the art as "hot air", and a hot air outlet 30 therefrom.

The van-trailer 12 is adapted, in accordance with the present invention, for alternatively carrying general freight in the conventional manner, or for carrying loads of bulk materials. A pair of openings 32, 34 are provided in the platform 18, located in spaced apart locations along the length of the trailer 12, as best seen in FIG. 2. As the openings 32 and 34 and elements and components associated therewith are substantially identical, the description will be facilitated by describing in detail the opening 32 and its associated elements.

The opening 32 is substantially rectangular and is framed on the four sides thereof by suitable structural support members such as channel-type beams 36, 38, as best seen in FIG. 4. A hopper 40 is provided, being substantially oval in cross-section as best seen in FIG. 2 and including an upper flange or lip portion 42, as best seen in FIG. 4, which is adapted to engage the four channel-type support beams including the illustrated beams 36, 38 so as to hold the hopper 40 in a fixed position in the opening 32 of the floor 18. Suitable additional attachment members (not shown), such as bolts, may be provided for securing the lip or flange portion 42 of the hopper 40 to the four beams including the illustrated beams 36 and 38. A framework 44, comprising a number of structural members is mounted upon the floor or platform 18 and extends generally along the sidewalls 22 and 24 and beneath the roof 20, to define generally a box-like framework extending above the opening 32. A collapsible container 46 having an open bottom portion is attached by suitable means substantially about the periphery of the opening at the upper portion of the hopper 40, whereby the hopper 40 defines a bottom of the opening 32 and of the container 46. The container 46 is selectively erectable for attachment to the framework 44 by suitable means such as cables 48 and 50. When the container 46 is erected, additional support means such as cables 52 and 54 may be attached thereto and to suitable tie down members 56 attached to the floor or platform 18. The container 46 preferably comprises a relatively light weight bag-like structure, constructed of a suitable synthetic fiber such as an Aramed fiber made by Burlington Industries or alternatively a Kevlar material made by Dupont. The container 46 may further be laminated and/or urethane coated to provide additional strength thereto. A generally circular aperture 58 is provided in the top portion of the container 46 for loading bulk materials into the container 46 and a hatch structure comprises a generally annular collar member 60 attached around the periphery of the aperture 58 by suitable means, and a generally circular hatch member 62 to fit over the collar 60. Suitable means such as latches 64 are provided for selectively holding the hatch 62 in firm engagement with the collar 60 or for allowing removal of the hatch 62 for loading the container 46 through the aperture 58. A complimentary aperture 66 is formed in the roof 20 of the trailer and provided with a removable cover member 68 for loading materials through the aperture 66 of the roof 20 into the container 46 via the aperture 58 therein. The collar 60 is provided with suitable support means such as cables 70 and 72 to hold the aperture 58 substantially centered beneath the complimentary aperture 66 in the trailer roof 20.

A closure for the opening 32 in the platform or floor 18 of the trailer preferably comprises a pair of doors 74, 76, as best seen in FIGS. 1, 2 and 3. The doors 74 and 76 are attached to the sides of the opening 32 by suitable means such as hinges (not shown), for selectively opening or closing the doors 74 and 76 to expose or cover the opening 32. It will be appreciated, then, that with the doors 74 and 76 in their opened position, and leaning against the sidewalls 22 and 24, as best seen in FIG. 3, the container 46 may be erected, as described, for carrying loads of bulk materials. When it is desired to use the trailer 12 for carrying general freight loads, the container 46 may be collapsed, as shown in phantom line in FIG. 4, and the doors closed thereover to cover the opening 32 and form a continuation of the platform or floor 18.

Additional means for erecting and for unloading the container 46 is provided by a hot air line 78 connected by a suitable connecting member 80 to the hopper 40, as best seen in FIGS. 1 and 4. The hot air line 78 is connected to the hot air outlet 30 of the tractor 10 to deliver pressurized air to the hopper 40. It will be appreciated that when the container 46 is collapsed in the hopper 40, as shown in phantom line in FIG. 4, the container may be erected by opening the doors 74, 76 and introducing pressurized air via the line 78, causing the container 46 to rise substantially to its erected position. When the container 46 is inflated in this fashion, the support cables 48, 50, 52 and 54 may then be attached thereto and the support cables 70 and 72 attached to the collar 58 to suitably position the container for receiving bulk materials. Similarly, when the container 46 is loaded with bulk material, air under pressure may be introduced thereto, via the hopper 40 and line 78 to effect pressurized unloading of the materials through the bottom of the hopper 40. A blow pipe 84, of known construction is preferably provided, attached to the bottom of the hopper 40, for pressurized unloading of materials therethrough.

It will be appreciated that the elements and components described above associated with the opening 32 in the trailer floor or platform 18 are similarly provided at the opening 34 therein. Thus, the trailer 12 is provided with two selectively erectable and collapsible containers such as the container 46 for carrying loads of bulk materials, and two pairs of doors such as the doors 74 and 76 for closing over the collapsed containers to provide a single continuous surface, together with the platform 18, for carrying general freight loads.

Figure 5:
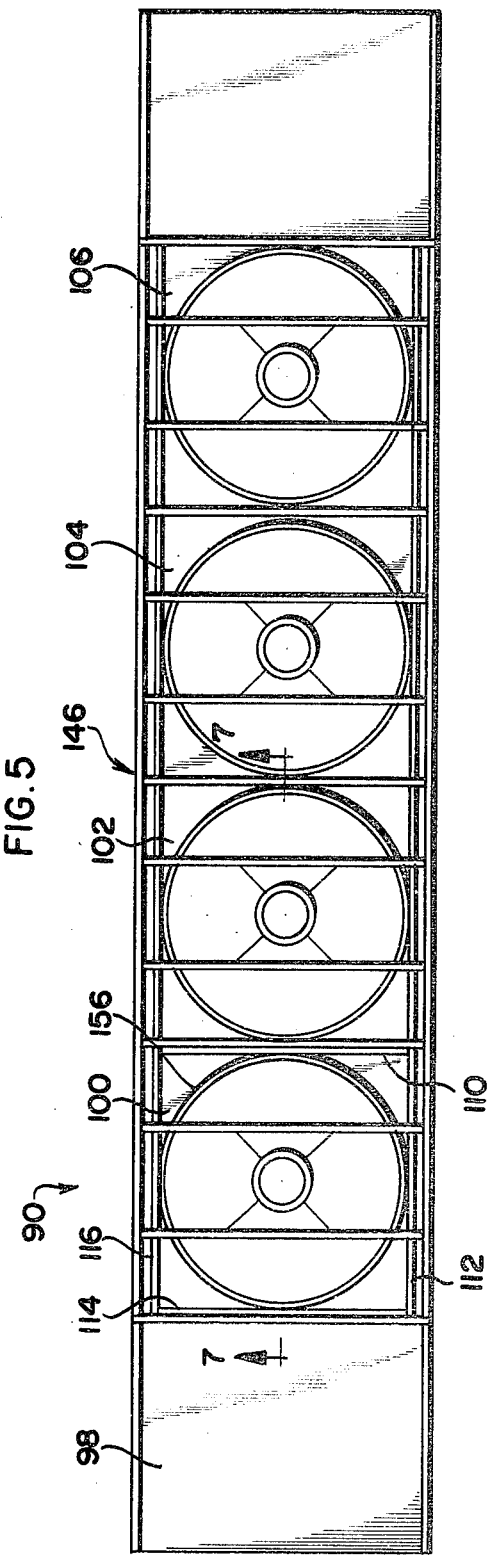
FIG. 5 is a top view of a second embodiment of a trailer incorporating features of the present invention.
Figure 6:
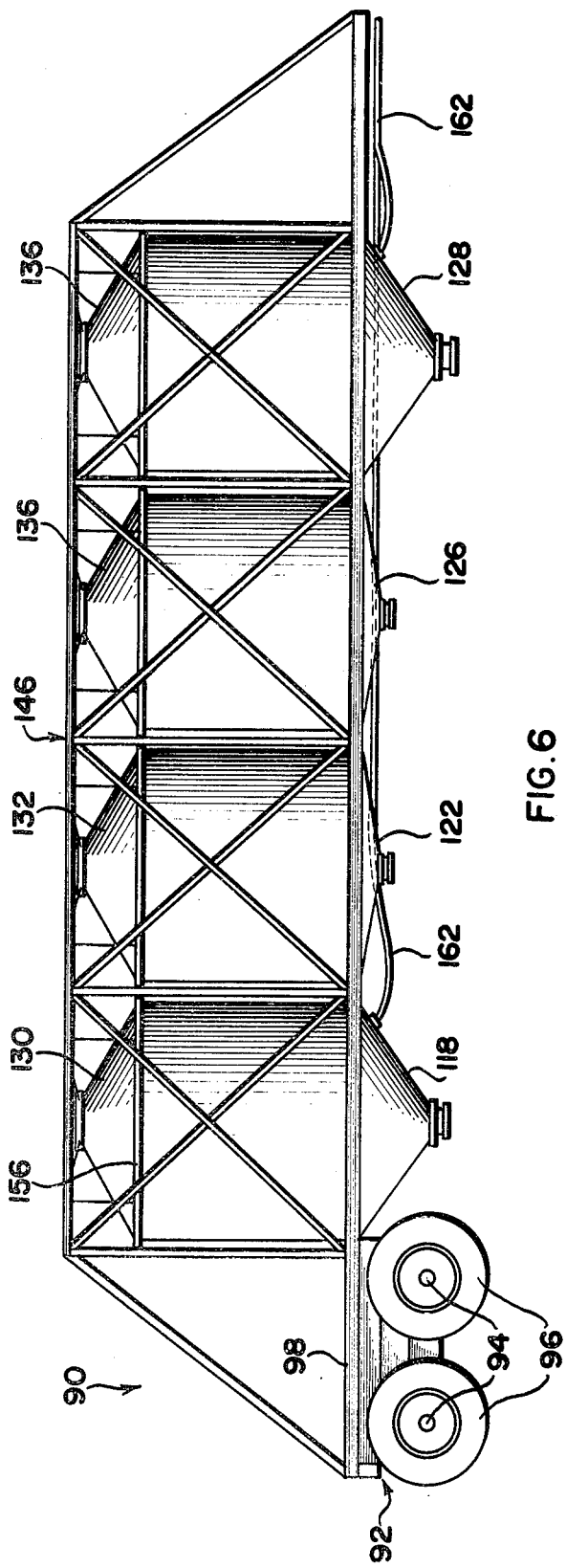
FIG. 6 is a side elevational view of the trailer of FIG. 5.
Figure 7:
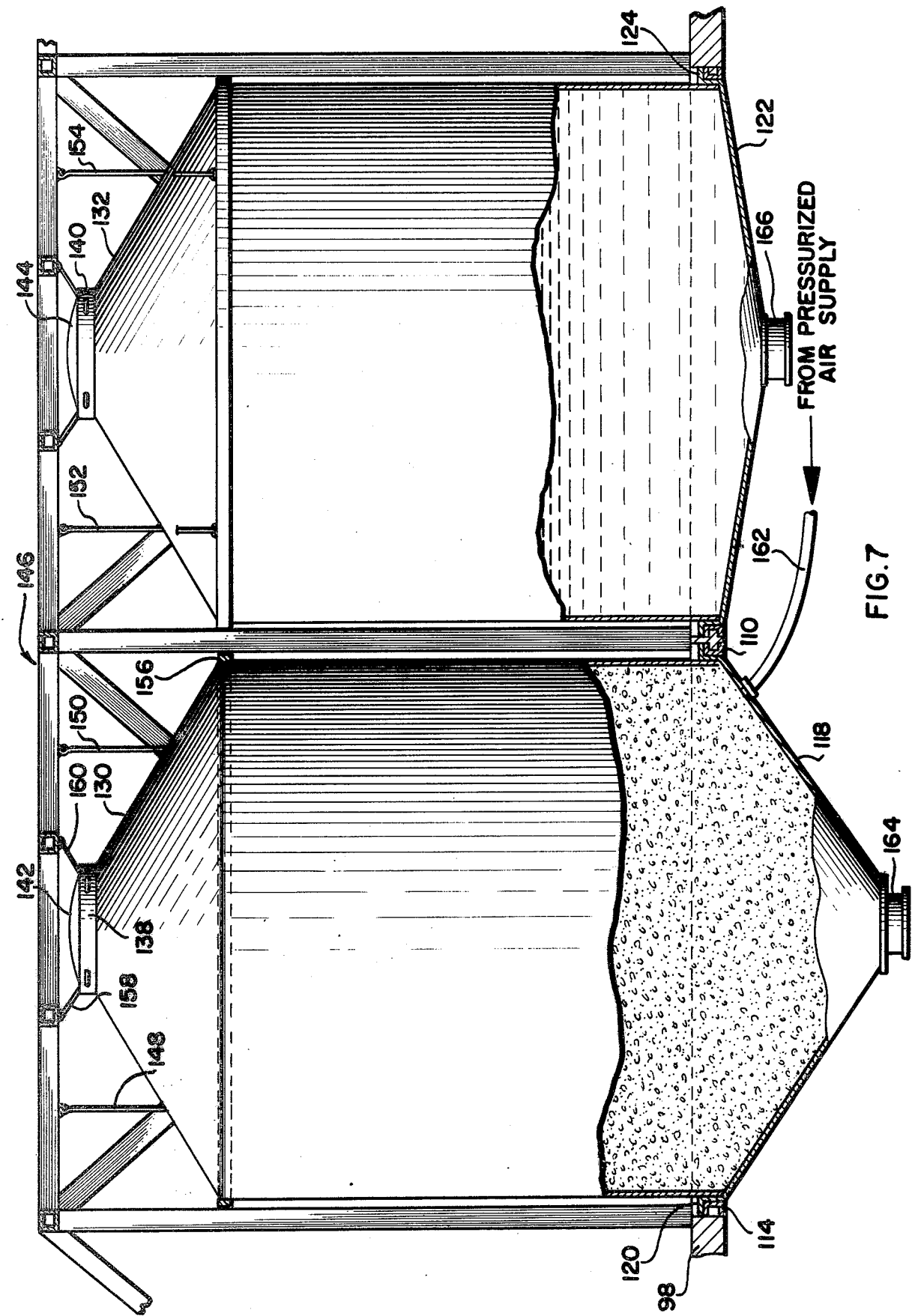
FIG. 7 is an enlarged side elevation, partially cut away, taken generally along the line 7—7 of FIG. 5.

Referring now to FIGS. 5, 6 and 7, a second embodiment of a vehicle, constructed in accordance with the principles of the present invention, is illustrated. A trailer 90 comprises a suspension 92 including a pair of axles 94 with wheels 96 attached thereto and a platform 98 mounted upon the suspension 92 to be carried by the axles 94 and wheels 96. The trailer 90 thus comprises, substantially, a flat bed-type trailer vehicle, as known in the art.

The flat bed trailer 90 is adapted, in accordance with the present invention, for alternatively carrying general freight in the conventional manner, of for carrying loads of bulk material. Four openings 100, 102, 104 and 106 are provided in the platform 98, located substantially adjacent one another along the length of the trailer 90, as best seen in FIG. 5. The openings 100, 102, 104, 106 and the components associated therewith are substantially identical, therefore the description will be facilitated at some points by describing in detail only one of the openings 100, 102, 104, 106 and its associated elements.

The opening 100 is substantially square and is framed on the four sides thereof by suitable structural support members 110, 112, 114 and 116, which may comprise, for example, channel-type beams. A hopper 118 is substantially conical and includes an upper flange or lip portion 120, as best in FIG. 7, which engages the four support beams 110, 112, 114 and 116, which provide suitable support for holding the hopper 118 in a fixed position to define a bottom of the opening 100 of the platform 98, as best seen in FIG. 7. Suitable additional attachment members (not shown) such as bolts, may be provided for securing the lip or flange portion 120 of the hopper 118 to the support members 110, 112, 114 and 116. It will be appreciated that the hopper 118 is of suitable configuration for unloading of dry bulk materials. Similarly, a slope pan 122 of similar configuration to the hopper 118, but of shallower slope, suitable for the unloading of liquid bulk materials, is provided at the opening 102. The slope pan 122 is provided with a flange portion 124 similar to the flange portion 120 of the hopper 118 for attachment to structural support members framing the opening 102, similar to the members 110, 112, 114 and 116 framing the opening 100. In similar fashion, a slope pan 126 and a hopper 128, substantially identical to the slope pan 122 and a hopper 118 are associated with the openings 104 and 106 in the same manner described above for the hopper 118 and slope pan 122.

Collapsible containers 130, 132, 134 and 136 are attached by suitable means substantially about the respective peripheries of the openings of the upper portions of the hoppers 118, 128 and slope pans, 122, 126, in the manner illustrated in FIG. 7 for the containers 130 and 132, the hopper 118 and the slope pan 122. Thus, the respective hoppers and slope pans also define the bottom portions of the respective containers. The containers 130, 132, 134 and 136 are substantially cylindrical in shape and open at their bottom portions, where they engage the respective hoppers and slope pans, and include generally conically shaped top portions terminating in circular top apertures of substantially smaller diameter than the diameter of the cylindrical portions thereof. The containers preferably comprise relatively light weight bags constructed of the same materials as described for the container 46 of FIGS. 1 through 4. As best seen in FIG. 7, annular collars 138 and 140 and circular hatches 142 and 144 are attached to the top apertures of the containers 130 and 132 and are of similar structure and function as that described above for the collar 60 and hatch 62 of the container 46 of FIG. 4.

A framework 146 is erected upon the platform 98 for supporting the containers 130, 132, 134 and 136 and comprises a web-like construction of suitable tubular metal members which make up a truss frame for providing suitable support for the containers. As best seen in FIG. 7, the containers 130 and 132 are attached to the framework 146 by suitable cables 148, 150, and 152, 154, respectively, which may be attached to suitable eyelets formed in the containers 130 and 132 and similar eyelets attached to the framework 146. The containers 134 and 136 are attached to be supported by the framework 146 in similar fashion. A generally annular hoop member 156 of substantially the same diameter as the outer diameter of the cylindrical portion of the container 130 may be provided attached by suitable means to the container 130 for aiding in preserving the generally cylindrical shape thereof, and for providing an alternate place to attach the cables 148 and 150, for attachment of the container 130 to the supporting framework 146. A similar hoop member may be attached in the fashion described to the containers 132, 134 and 136. The collar 138 is attached to suitably positioned cross members of the framework 146 by cables 158 and 160, to provide positioning and support of the top portion of the container 130. Similar cables are provided for corresponding collars of the containers 132, 134 and 136 for attachment to the framework 146. The hatches 142 and 144 provide suitable means for loading of materials through the top openings of the containers 130 and 132.

It will be appreciated, that the containers 130, 132, 134 and 136 may be detached from the supporting framework 146 and either collapsed into the respective hoppers and slope pans for storage or removed entirely therefrom, and suitable closures or covers (not shown) may be provided for the openings 100, 102, 104 and 106. The closures or covers may be carried upon a portion of the platform 98 adjacent the containers, to be utilized as desired for covering unused openings. Thus, the trailer 90 or portions thereof may alternatively be used substantially as a flat bed trailer for carrying general freight loads. Additional means for erecting and unloading the containers 130 and 136, which are associated with the hoppers 118 and 128 for carrying dry bulk materials, are provided by a pressurized air line connected by suitable means to the hoppers 118 and 128. The air line 162 may be connected to a suitable pressurized air source, such as on a tractor (not shown), in a similar fasion to the hot air line 78, described above in FIG. 4. Thus, pressurized air may be introduced to effect pressurized unloading of materials in the container 130 through the hopper 118. It will be noted, in this connection, that the hopper 118, as well as the hopper 128 and slope pans 122 and 126 are provided with suitable outlet members, such as the members 164, 166, of FIG. 7 which may comprise suitable valves or the like, as known in the art, for selectively unloading materials therethrough.

It will be appreciated, in accordance with the foregoing descriptions, that the containers 130, 132, 134 and 136 may be selectively used to provide a combination of liquid or dry bulk materials capacity and flat deck space upon the trailer 90. For example, the containers 130 and 136 may be used for carrying dry bulk materials to a given destination, and the containers 132 and 134 utilized to carry liquid bulk materials from that destination to yet another location, the unused containers, in each case, being collapsed to provide deck space for carrying additional general freight, as desired. Further, the containers 130, 132 134 and 136 may be readily removed and replaced by similar containers which may be carried, for example, collapsed, on the unused portions of the platform 98 of the trailer 90. Thus, the need for cleaning containers between loads of different bulk materials, necessary in vehicles comprising rigid non-removable containers, is substantially eliminated.

The drawings and the foregoing descriptions are not intended to represent the only forms of the invention with regard to the details of its construction and manner of operation. Changes in form and in the proportions of parts, as well as the substitution of equivalents, may be apparent to those skilled in the art, and will be understood as forming a part of the present invention insofar as they fall within the spirit and scope of the appended claims.

The invention is claimed as follows:

1. A mobile, over the road-type vehicle for carrying, selectively, bulk materials and general freight comprising in combination: mobile trailer means including platform means, opening means formed in said platform means, closure means for selectively covering and exposing said opening means, framework means mounted upon said platform means above said opening means, collapsible container means on said platform means and having an open bottom portion engaged substantially about the periphery of said opening means and selectively erectable for attachment to said framework means, said container means comprising a generally cylindrical, bag-like member constructed from a strong, light weight synthetic fiber such as Kevlar, for carrying said bulk materials, unloading means mounted below said opening means to define a bottom of said container means and for selectively unloading said bulk materials, said container means being selectively collapsible to be carried in said unloading means and said closure means selectively closable thereover to form a continuation of said platform means for adapting said vehicle for carrying general freight loads and including cable means for removably attaching said container means to said framework means, and to said platform means to support the erected and bulk material filled container means.

2. A mobile vehicle according to claim 1 further including means for removably engaging said bottom portion of said container means about the periphery of said opening for selectively removing and replacing said container means.

3. A mobile vehicle according to claim 1 wherein said trailer means comprises a van-type trailer including front, back and side walls attached to said platform and a roof attached to said walls to form an enclosure.

4. A mobile vehicle according to claim 3 wherein said opening means comprises two openings formed in spaced apart locations along the length of said platform, and said container means comprises two similar containers attached about the periphery of said openings respectively.

5. A mobile vehicle according to claim 4 wherein said unloading means comprises two hoppers.

6. A mobile vehicle according to claim 1 wherein said framework means comprises a plurality of tubular members interconnected to form a truss frame to support and carry said container means and said bulk material therein, so as to substantially eliminate side wall loading by said bulk materials.

7. A mobile vehicle according to claim 1 wherein said container means further includes a generally conical portion extending from the top of said cylindrical member and terminating in a generally circular aperture for loading of said bulk materials into said container.

8. A mobile over the road-type vehicle for carrying, selectively, liquid and dry bulk materials and general freight comprising in combination: mobile trailer means including platform means, a plurality of openings formed in said platform means, framework means mounted upon said platform means above said openings, a plurality of container means each comprising a generally cylindrical, bag-like member of strong, lightweight material such as Kevlar, and having a support ring about its upper periphery and an open bottom end portion engaged substantially about the periphery of one of said plurality of openings and each container means being selectively erectable, cable means for removably attaching each said support ring to said framework means to support the container when erected, for containing, selectively, said liquid and dry bulk materials, a plurality of unloading means mounted below said plurality of opening means to define bottoms thereof and of said plurality of container means, ones of said unloading means being adapted for unloading said dry bulk materials and others of said unloading means being adapted for unloading said liquid bulk materials, said container means further being selectively collapsible for being carried in said unloading means and cover means selectively attachable over said openings to form a continuation of said platform means for adapting said vehicle for carrying general freight loads.

9. A mobile vehicle according to claim 8 wherein said opening means comprises four openings formed along the length of said platform means and said container means comprises four containers attached substantially about the respective peripheries of said openings.

10. A mobile vehicle according to claim 8 wherein said unloading means comprises two substantially conical hoppers for unloading of dry bulk materials, mounted below two of said four containers and two generally conical slope pans for unloading of liquid bulk materials mounted below another two of said four containers.

11. A mobile vehicle according to claim 8 further including air pressure means for inflating said collapsible container means to erect said container means for carrying said bulk materials and for providing pressurized unloading means for said bulk materials.

12. A mobile vehicle according to claim 8 further including means for removably engaging said bottom end portions of the container means about said peripheries of said openings for selectively removing and replacing said container means.

* * * * *